Figure 1:
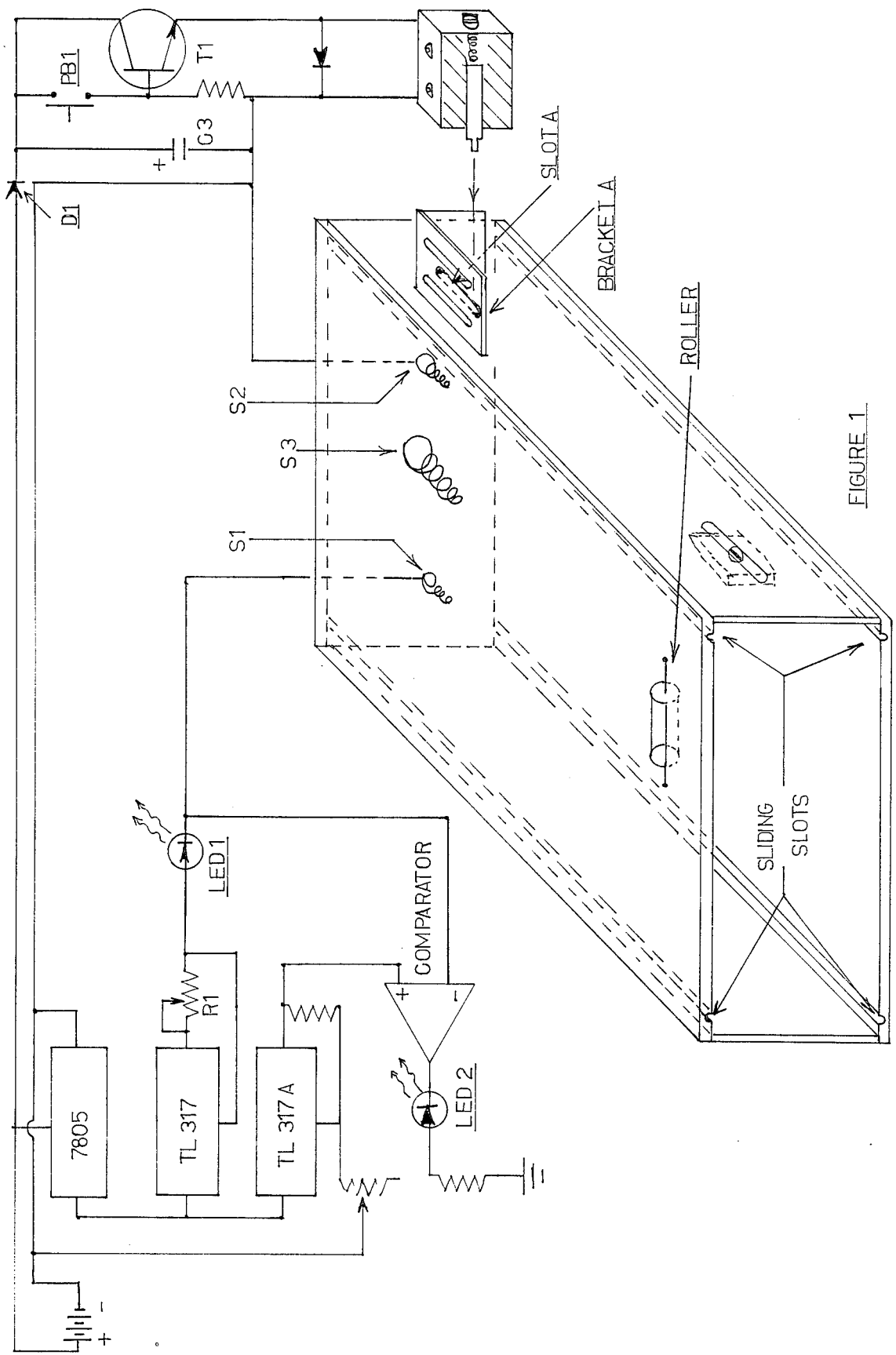

United States Patent [19]

Wigell

[11] Patent Number: 4,710,693
[45] Date of Patent: Dec. 1, 1987

[54] FRONT LOADING CONTINUOUS CHARGER

[76] Inventor: Arthur H. Wigell, 6647 Wheeler Ave., La Verne, Calif. 91750

[21] Appl. No.: 39,443

[22] Filed: Apr. 17, 1987

[51] Int. Cl.⁴ .................. H02J 7/00; H01M 10/46
[52] U.S. Cl. .................................... 320/2; 320/48
[58] Field of Search .............................. 320/2, 48

[56] References Cited

U.S. PATENT DOCUMENTS

| | | | |
|---|---|---|---|
| 3,659,180 | 4/1972 | Urbush | 320/2 |
| 3,823,367 | 7/1974 | Kaye et al. | 320/2 X |
| 4,141,616 | 2/1979 | Gottlieb | 320/2 X |
| 4,629,962 | 12/1986 | Arakawa | 320/2 |

Primary Examiner—R. J. Hickey

[57] ABSTRACT

A front loading facility for continuously charging rechargeable batteries in headphones or other device, comprises an enclosure containing a slidable drawer in which rests the device to be charged. The device to be charged has contacts which bear against spring contacts when the drawer is closed, but a spring ejects the drawer upon energizing of a solenoid of actuated latch. A voltage and current regulated power supply continuously charges the batteries through a light emitting diode, which has a secondary function of preventing inadvertent battery discharge.

5 Claims, 2 Drawing Figures

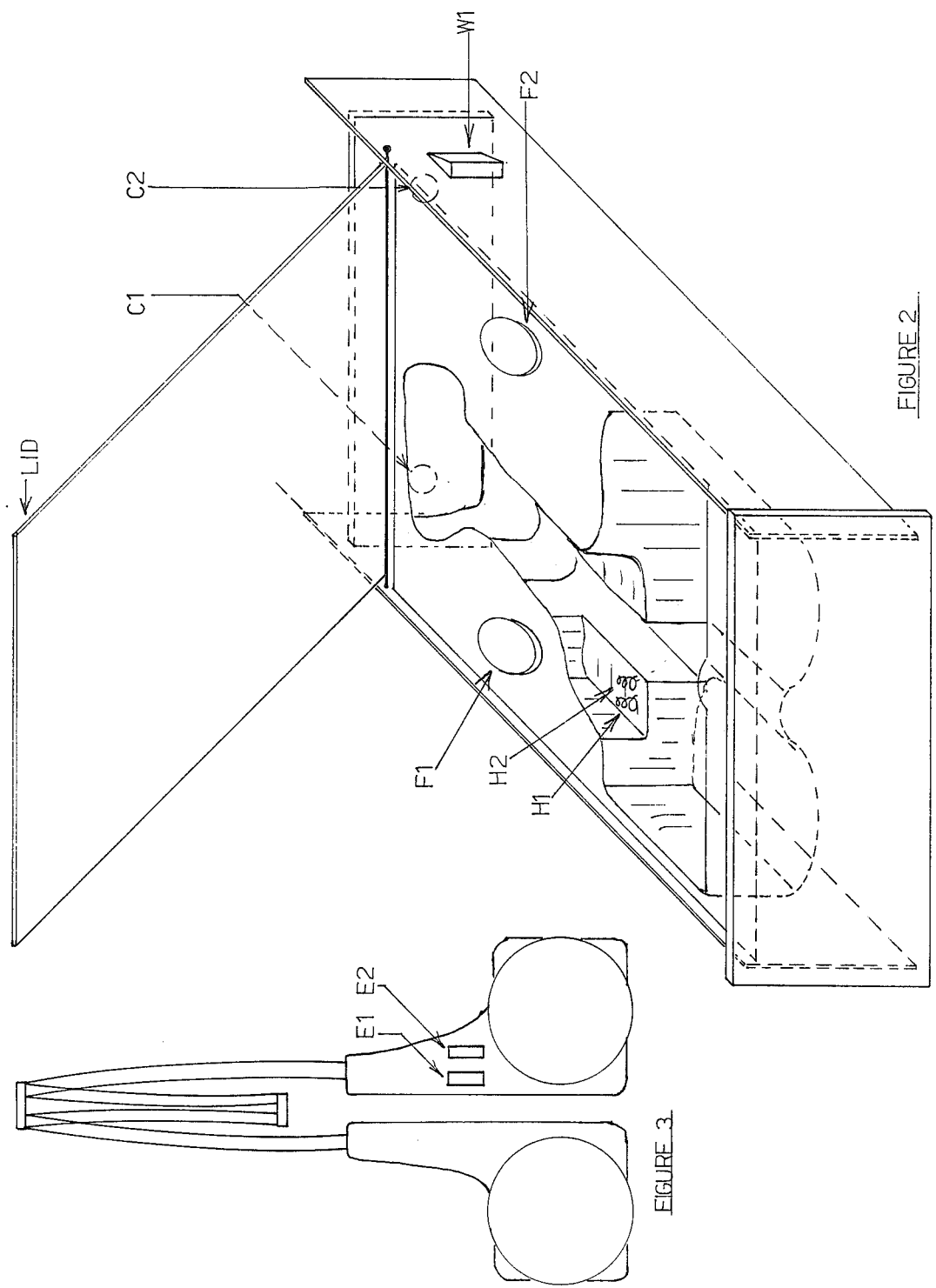

FRONT LOADING CONTINUOUS CHARGER

A front loading continuous charging facility for radio headphones allowing for the charging and garaging of headphones or similar devices using rechargable batteries.

FIELD OF THE INVENTION

The invention lies in the field of continuously charging nickel cadmium devices or similar rechargable batteries and the utilization thereof in maintaining a fully charged battery state in combination with a front loading garaging facility for storage during charging.

PRIOR ART

No pertinent prior art is presently known for the combined garaging and charging facility presented herewith. However, there is a well known feature in cordless telephones which continuously charge the cordless handpiece when it is placed on the transmitting module.

DISCLOSURE

This invention entitled "Front Loading Continuous Charger" relates to certain improvements in rechargable apparatus.

The objective of continuous charging is to provide a fully charged state for rechargable batteries so that the device they are incorporated in can be used when needed.

The object of this invention is to provide a charging facility which enables the user to store a radio headphone or other such device using rechargable batteries in a pre-formed (dependent on the exterior structure of the device) front loading drawer enabling both the charging and storage of the device when the drawer is closed. As a result, this invention provides an improvement in continuous charging units already available.

For the following discussion please refer to FIG. 1. FIG. 1 depicts a perspective view of the outer enclosure for the drawer. Above the perspective view of the drawer is the schematic for the electronic circuit for operating the device. To the right of the outer enclosure is the solenoid which fits to bracket A, the spring loaded plunger passing through the small slot in the side of the outer enclosure acting as a locking mechanism.

According to this invention, there is provided a continuous charging facility. This consists of a voltage regulated power supply (7805). The regulated DC voltage is passed to a current regulator (TL317) which allows a continuous regulated current. It is a well known fact that rechargable batteries can be charged continuously at 1/16 their rated capacity without damaging the batteries. The current is regulated to 1/16 capacity by R1. The regulated current is passed through a light (LED 1) emitting diode which becomes illuminated upon contact with the rechargable batteries thereby indicating they are under charge. It also acts to stop the batteries discharging through the circuit. A second adjustable voltage regulator (TL317 A) is also incorporated in the circuit providing an adjustable voltage to the + input pin of a comparator. A light emitting diode (LED 2) is connected to the output of the comparator. The output of the voltage regulator is adjusted so as to supply a trip voltage. As the batteries reach a fully charged state, the voltage will rise until a state is reached where there is no further increase in voltage. The voltage into the +input of the comparator is adjusted so that the trip voltage is at such a level that when the charging voltage exceeds this trip setting, the light emitting diode becomes illuminated indicating a fully charged state. Contact from the charger to the inner sliding drawer is made through the springcontacts at the rear of the outer enclosure (S1 and S2).

According to this invention, there is provided a push button operated solenoid (FIG. 1) lock which is spring loaded. The circuit is depicted in FIG. 1. A DC power supply provides the voltage to drive the circuit. The positive + voltage passes through a diode and then a capacitor which is kept charged. The diode (D1) prevents the capacitor (C3) from discharging through the circuit. Upon depressing the pushbutton (PB1), transistor (T1) is biased into conduction allowing the current to flow to the solenoid through the power transistor T1. This current surge causes the plunger of the solenoid to be withdrawn. When assembled, the plunger abuts against the wedge (W1) in FIG. 2 through the slot A in FIG. 1 of the outer enclosure thereby stopping the drawer from being ejected by the spring S3 located at the rear of the outer enclosure of FIG. 1. The tip of the plunger interlocks at the front of the wedge when the drawer is closed. By activating the pushbutton, the plunger is withdrawn thereby allowing the drawer to spring open.

According to the invention, there is provided a depression (FIG. 2) in the sliding drawer in the shape of the device to be recharged. Within this depression are two contacts (H1:H2) which are spring loaded. These contacts provide the current for recharging the batteries in the device. There are leads from these two contacts which are contacted to two metal electrodes located at the rear of the sliding drawer. When the drawer is closed these two metal contacts (C1 and C2) make contact with springs S1 and S2 thereby completing the charging circuit.

According to the invention, radio headphones or similar devices have two external metal electrodes which are attached to the main body of the unit (see FIG. 3). These electrodes are depicted in FIG. 3 designated E1 and E2. These external electrodes are connected internally to a rechargable battery observing the correct polarity so that when the headphones are placed in the drawer, they make contact with the spring loaded contacts within the depression in the drawer; the contacts being of the same polarity.

According to the invention, a lid (depicted in FIG. 2) which is hinged, is placed on top of the headphones once they are placed in the depression thereby applying pressure so that a good contact is made. Slots have been used to allow the upper and lower edges of the drawer to slide within the outer enclosure (slots depicted in FIG. 1). A small roller has been incorporated in the upper portion of the outer enclosure to reduce the resistance encountered when the drawer is closed by reducing the surface area the lid is in contact with the outer enclosure. Foam or springs have been used (depicted in FIG. 2-F1 and F2) so that when the drawer is ejected, the lid will automatically open due to the applied pressure of F1 and F2.

The claims defining the invention are as follows:
1. A front loading continuous charging facility for radio headphones or other device using rechargeable batteries comprising:
   an outer enclosure having an electrically releasable latch, a drawer slidable within the outer enclosure having latch engagement means releasably engaged by said latch, a depression in the drawer of shape complementary to the shape of the device to be charged, resilient contacts in the drawer co-operable with complementary contacts on said device to be charged when contained in the drawer and the drawer is closed, and a voltage and current regulated power supply circuit in said enclosure coupled to said contacts.

2. A front loading continuous charging facility according to claim 1 wherein said voltage and current regulated power supply circuit comprises a first voltage regulator, a current regulator, a second voltage regulator, a first light emitting diode between the first voltage regulator and one of said resilient contacts, a comparator coupled to said one of resilient contacts and to the output of the current regulator, and a second light emitting diode coupled to the output of the comparator.

3. A front loading continuous charging facility according to claim 1 wherein said electrically releasable latch comprises a solenoid having a spring loaded plunger, a diode in a first power supply line to said solenoid, a capacitor coupled to the output of the diode and a second power supply line to said solenoid, a power transistor across the capacitor, and a push button which, upon closure, biases the power transistor into conduction to conduct a surge of current from the capacitor through the solenoid.

4. A front loading continuous charging facility according to claim 3 wherein said enclosure contains an ejection spring which urges the drawer to an open position when said solenoid releases said latch.

5. A front loading continuous charging facility according to claim 1 wherein said enclosure comprises a lid hinged at one end to close over said device to be charged when contained in said drawer.

* * * * *